("12") United States Patent
Fujishiro

(10) Patent No.: US 12,231,980 B2
(45) Date of Patent: Feb. 18, 2025

(54) COMMUNICATION CONTROL METHOD AND USER EQUIPMENT

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 343 days.

(21) Appl. No.: 17/711,411

(22) Filed: Apr. 1, 2022

(65) Prior Publication Data
US 2022/0225202 A1 Jul. 14, 2022

Related U.S. Application Data

(63) Continuation of application No. PCT/JP2020/037592, filed on Oct. 2, 2020.

(30) Foreign Application Priority Data

Oct. 3, 2019 (JP) ................................ 2019-183126

(51) Int. Cl.
H04W 36/08 (2009.01)
H04W 36/30 (2009.01)
H04W 74/0808 (2024.01)
H04W 36/00 (2009.01)

(52) U.S. Cl.
CPC ......... *H04W 36/08* (2013.01); *H04W 36/302* (2023.05); *H04W 74/0808* (2013.01); *H04W 36/008355* (2023.05)

(58) Field of Classification Search
CPC .. H04W 36/30; H04W 36/08; H04W 74/0808
See application file for complete search history.

(56) References Cited

U.S. PATENT DOCUMENTS

2020/0413310 A1* 12/2020 Han ...................... H04W 76/27

FOREIGN PATENT DOCUMENTS

| CN | 108307460 A | | 7/2018 | |
| CN | 111294871 A | * | 6/2020 | ........ H04W 36/0083 |
| EP | 3648500 A1 | * | 5/2020 | ........... H04B 17/318 |
| JP | 2000-358268 A | | 12/2000 | |
| JP | 2013-77964 A | | 4/2013 | |
| JP | 2019-62542 A | | 4/2019 | |
| WO | 2018/087735 A1 | | 5/2018 | |
| WO | WO-2019031796 A1 | * | 2/2019 | ............ H04W 16/14 |

OTHER PUBLICATIONS

Ericsson, "Handling LBT failures", 3GPP TSG-RAN WG2 #104, R2-1817969, Nov. 12-16, 2018, pp. 1-5, Spokane, Washington, USA.

(Continued)

*Primary Examiner* — Samina F Choudhry
(74) *Attorney, Agent, or Firm* — Studebaker & Brackett PC

(57) ABSTRACT

A user equipment according to an aspect includes a processor. The processor executes: processing of attempting, in a predetermined period, reception of a reference signal periodically transmitted from a cell in an unlicensed band; processing of counting at least one of the number of unsuccessful receptions of the reference signal in the predetermined period and the number of successful receptions of the reference signal in the predetermined period; and processing of performing mobility control of the user equipment, based on the counted number.

9 Claims, 8 Drawing Sheets

(56) References Cited

OTHER PUBLICATIONS

Ericsson, "Handling DL LBT failures", 3GPP TSG-RAN WG2 #106, R2-1907590, May 13-17, 2019, pp. 1-4, Reno, USA.
3rd Generation Partnership Project; Technical Specification Group Radio Access Network; NR; NR and NG-RAN Overall Description; Stage 2, Release 15, 3GPP TS 38.300 V15.3.0, Sep. 2018, pp. 1-92.

\* cited by examiner

COMMUNICATION CONTROL METHOD AND USER EQUIPMENT

RELATED APPLICATIONS

The present application is a continuation based on PCT Application No. PCT/JP2020/037592, filed on Oct. 2, 2020, which claims the benefit of Japanese Patent Application No. 2019-183126 filed on Oct. 3, 2019. The content of which is incorporated by reference herein in their entirety.

TECHNICAL FIELD

The present disclosure relates to a communication control method and a user equipment.

BACKGROUND ART

In Long Term Evolution (LTE) of the 3rd Generation Partnership Project (3GPP), License-Assisted Access (LAA) has been defined that allows LTE communication to be performed by using a combination of a licensed band being a frequency band of which license is required and an unlicensed band being a frequency band of which license is not required. Note that the unlicensed band may be referred to as an Unlicensed spectrum.

In recent years, New Radio (NR) as the 5th generation (5G) radio access technology has been standardized in 3GPP. Although, in the present specifications of NR, a system of using the unlicensed band is not defined, 3GPP has started the discussion for introducing a technology called NR-U which uses the unlicensed band in NR communication.

In NR-U, it is assumed that it becomes possible to use only the unlicensed band without using the unlicensed band in combination with the licensed band. Under such an assumption, a new function is considered to be required, the new function being a function which is not provided in LAA.

CITATION LIST

Non-Patent Literature

NPL 1: 3GPP Technical Specification "TS38.300 V15.3.0" September 2018, Internet <URL: http://www.3gpp.org/ftp//Specs/archive/38_series/38.300/38300-f30.zip>

SUMMARY OF INVENTION

A communication control method according to the first aspect is a communication control method executed by a user equipment. The communication control method includes: attempting, in a predetermined period, reception of a reference signal periodically transmitted from a cell in an unlicensed band; counting at least one of the number of unsuccessful receptions of the reference signal in the predetermined period or the number of successful receptions of the reference signal in the predetermined period; and performing mobility control of the user equipment, based on the counted number.

A user equipment according to the second aspect includes a processor. The processor executes: processing of attempting, in a predetermined period, reception of a reference signal periodically transmitted from a cell in an unlicensed band; processing of counting at least one of the number of unsuccessful receptions of the reference signal in the predetermined period or the number of successful receptions of the reference signal in the predetermined period; and processing of performing mobility control of the user equipment, based on the counted number.

DESCRIPTION OF EMBODIMENTS

The present disclosure has an object to enable improvement of mobility control in NR-U.

A mobile communication system according to an embodiment will be described with reference to the drawings. In the description of the drawings, the same or similar parts are denoted by the same or similar reference signs.

Mobile Communication System

First, a configuration of a mobile communication system according to an embodiment will be described. Although the mobile communication system according to an embodiment is a 5G system of the 3GPP, LTE may be at least partially applied to the mobile communication system.

Figure 1:
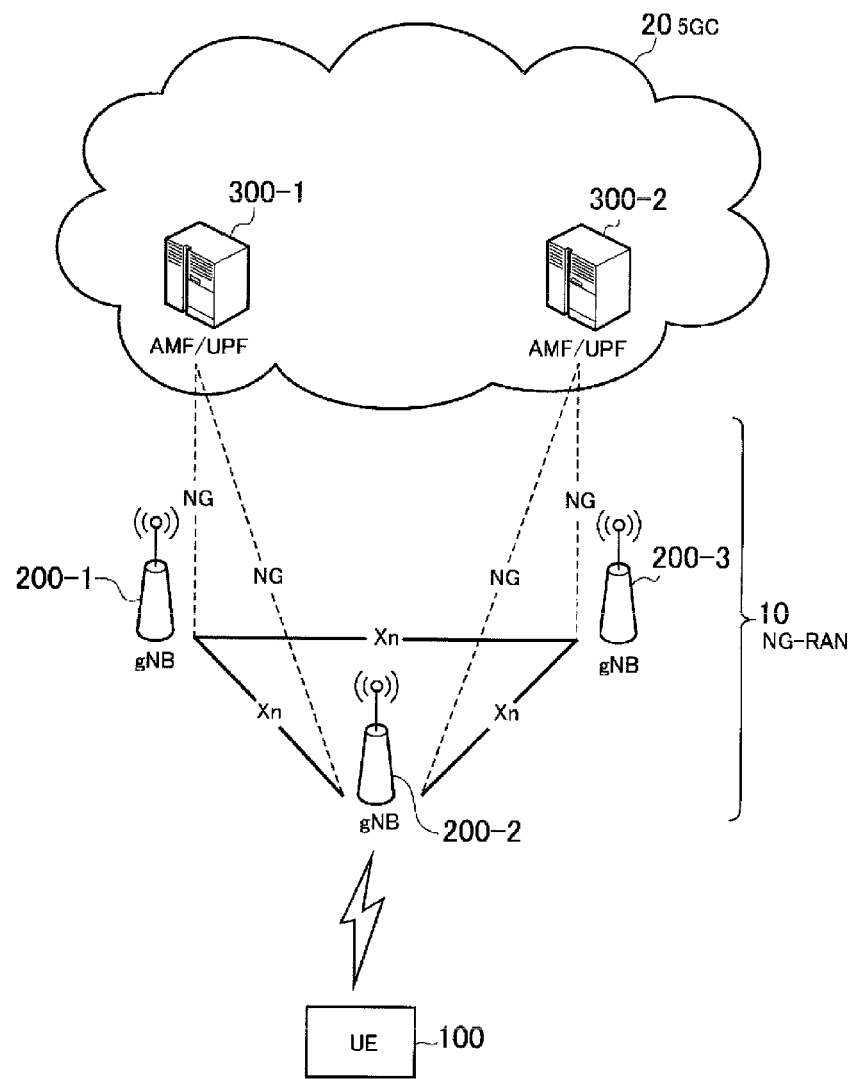
FIG. 1 is a diagram illustrating a configuration of a mobile communication system according to an embodiment.

FIG. 1 is a diagram illustrating a configuration of the mobile communication system according to an embodiment.

As illustrated in FIG. 1, the mobile communication system includes a user equipment (UE) 100, a 5G radio access network (next-generation radio access network (NG-RAN)) 10, and a 5G core network (5GC) 20.

The UE 100 is a mobile apparatus. The UE 100 may be any apparatus as long as the UE is used by a user. Examples of the UE 100 include, for example, a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), and/or a flying object or an apparatus provided on a flying object (Aerial UE).

The NG-RAN 10 includes base stations (referred to as "gNBs" in the 5G system) 200. The gNBs 200 may also be referred to as NG-RAN nodes. The gNBs 200 are connected to each other via an Xn interface which is an inter-base station interface. Each gNB 200 manages one or a plurality of cells. The gNB 200 performs radio communication with the UE 100 that has established a connection with its own cell. The gNB 200 has a radio resource management (RRM) function, a function of routing user data (hereinafter simply referred to as "data"), and/or a measurement control function for mobility control and scheduling. A "cell" is used as a term to indicate a minimum unit of a radio communication area. A "cell" is also used as a term to indicate a function or a resource for performing radio communication with the UE 100. One cell belongs to one carrier frequency.

Note that the gNB may be connected to an evolved packet core (EPC) which is a core network of LTE, or a base station of LTE may be connected to the 5GC. Moreover, the base station of LTE and the gNB may be connected via the inter-base station interface.

Although a case in which the gNB 200 performs radio communication with the UE 100 will be primarily described below, the gNB may perform radio communication with the UE 100 to control sidelink communication.

The 5GC 20 includes an access and mobility management function (AMF) and a user plane function (UPF) 300. The AMF performs various kinds of mobility control and the like for the UE 100. The AMF manages information of the area in which the UE 100 exists by communicating with the UE 100 by using non-access stratum (NAS) signaling. The UPF controls data transfer. The AMF and UPF are connected to the gNB 200 via an NG interface which is an interface between a base station and the core network.

Figure 2:
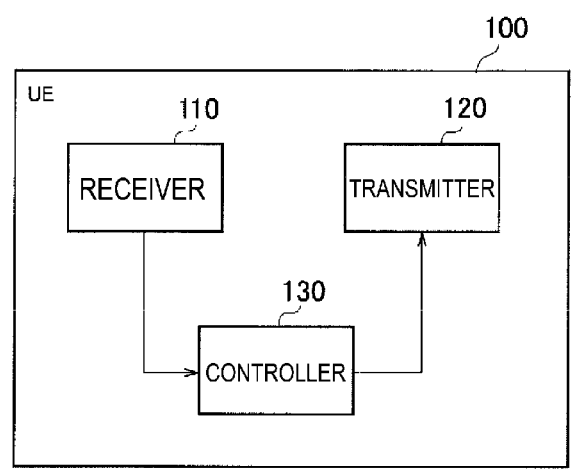
FIG. 2 is a diagram illustrating a configuration of a user equipment according to an embodiment.

FIG. 2 is a diagram illustrating a configuration of the UE 100 (user equipment).

As illustrated in FIG. 2, the UE 100 includes a receiver 110, a transmitter 120, and a controller 130.

The receiver 110 performs various kinds of receptions under control of the controller 130. The receiver 110 includes an antenna and a reception device. The reception device converts a radio signal received through the antenna into a baseband signal (reception signal) and outputs the resulting signal to the controller 130.

The transmitter 120 performs various kinds of transmissions under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various kinds of controls for the UE 100. The controller 130 includes at least one processor and at least one memory electrically connected to the processor. The memory stores programs to be executed by the processor and information to be used for processes by the processor. The processor may include a baseband processor and a central processing unit (CPU). The baseband processor performs, for example, modulation, demodulation, and coding and decoding of the baseband signal. The CPU executes the programs stored in the memory to perform various kinds of processes.

Figure 3:
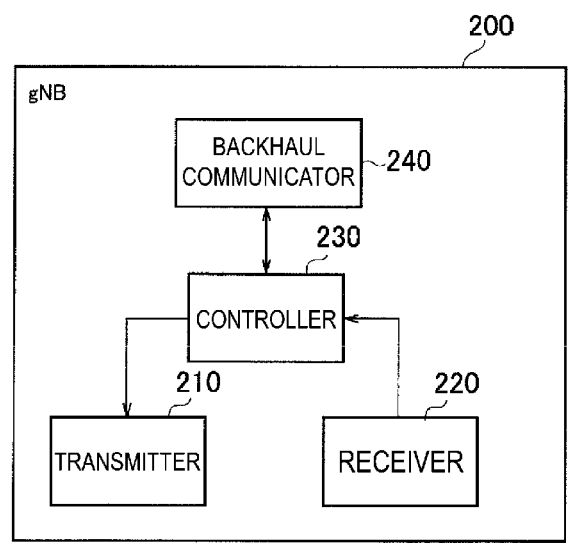
FIG. 3 is a diagram illustrating a configuration of a base station according to an embodiment.

FIG. 3 is a diagram illustrating a configuration of the gNB 200 (a base station).

As illustrated in FIG. 3, the gNB 200 includes a transmitter 210, a receiver 220, a controller 230, and a backhaul communicator 240.

The transmitter 210 performs various kinds of transmissions under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various kinds of receptions under control of the controller 230. The receiver 220 includes an antenna and a reception device. The reception device converts a radio signal received through the antenna into a baseband signal (a reception signal) and outputs the resulting signal to the controller 230.

The controller 230 performs various kinds of controls for the gNB 200. The controller 230 includes at least one processor and at least one memory electrically connected to the processor. The memory stores programs to be executed by the processor and information to be used for processes by the processor. The processor may include a baseband processor and a CPU. The baseband processor performs, for example, modulation, demodulation, and coding and decoding of the baseband signal. The CPU executes the programs stored in the memory to perform various kinds of processes.

The backhaul communicator 240 is connected to a neighboring base station via the inter-base station interface. The backhaul communicator 240 is connected to the AMF/UPF 300 via the interface between a base station and the core network. Note that the gNB may include a central unit (CU) and a distributed unit (DU) (i.e., functions are divided), and the two units may be connected via an F1 interface.

Figure 4:
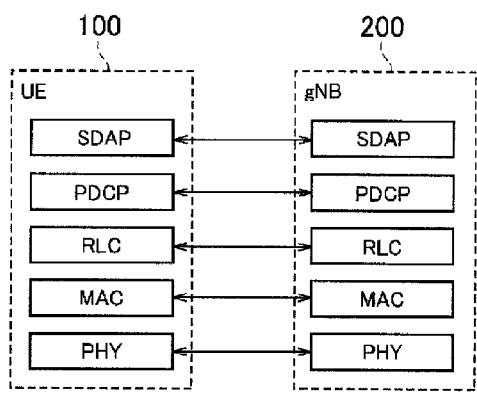
FIG. 4 is a diagram illustrating a configuration of the user equipment according to an embodiment.

FIG. 4 is a diagram illustrating a configuration of a protocol stack of a radio interface of a user plane for handling data.

As illustrated in FIG. 4, the radio interface protocol of the user plane includes a physical (PHY) layer, a medium access control (MAC) layer, and a radio link control (RLC) layer, a packet data convergence protocol (PDCP) layer, and a service data adaptation protocol (SDAP) layer.

The PHY layer performs coding and decoding, modulation and demodulation, mapping and demapping of antennas, and mapping and demapping of resources. Data and control information are transmitted between the PHY layer of the UE 100 and the PHY layer of the gNB 200 via a physical channel.

The MAC layer performs priority control of data, retransmission processing through a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines a transport format (a transport block size, a modulation and coding scheme (MCS)) of uplink and downlink, and an allocation resource block for the UE 100.

The RLC layer transmits data to the RLC layer on the reception side by using the functions of the MAC layer and the PHY layer. Data and control information are transmitted between the RLC layer of the UE 100 and the RLC layer of the gNB 200 via a logical channel.

The PDCP layer is to perform header compression and decompression, and encryption and decryption.

The SDAP layer performs mapping between an IP flow which is a unit of QoS control by the core network and a radio bearer which is a unit of QoS control by an access stratum (AS). Note that, when the RAN is connected to the EPC, the SDAP may not be provided.

Figure 5:
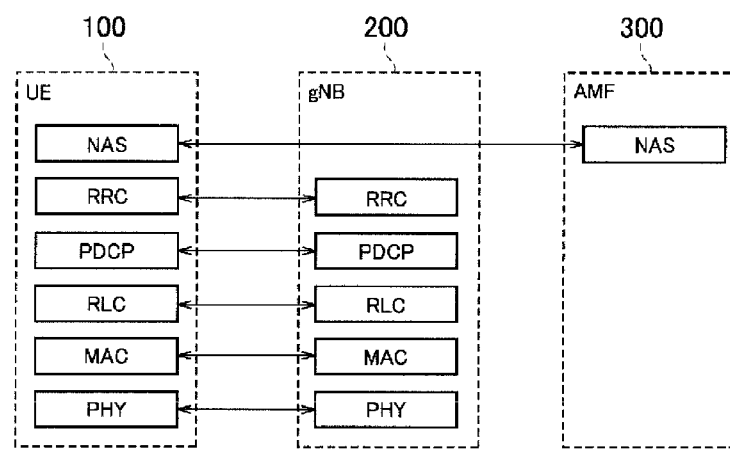
FIG. 5 is a diagram illustrating a configuration of a protocol stack of a radio interface of a user plane according to an embodiment.

FIG. 5 is a diagram illustrating a configuration of a protocol stack of a radio interface of a control plane handling signaling (control signals).

As illustrated in FIG. 5, the protocol stack of the radio interface of the control plane has a radio resource control (RRC) layer and a non-access stratum (NAS) layer instead of the SDAP layer illustrated in FIG. 4.

RRC signaling for various configurations is transmitted between the RRC layer of the UE 100 and the RRC layer of the gNB 200. The RRC layer controls the logical channel, the transport channel, and the physical channel in response to establishment, re-establishment, and release of the radio bearer. When there is a connection between the RRC of the UE 100 and the RRC of the gNB 200 (RRC connection), the UE 100 is in an RRC connected state. When there is no connection between the RRC of the UE 100 and the RRC of the gNB 200 (RRC connection), the UE 100 is in an RRC idle state. Furthermore, when the RRC connection is interrupted (suspended), the UE 100 is in an RRC inactive state.

The NAS layer higher than the RRC layer performs session management, mobility management, and the like. NAS signaling is transmitted between the NAS layer of the UE 100 and the NAS layer of the AMF 300.

Note that the UE 100 has an application layer and the like other than the protocol of the radio interface.

General Mobility Control

The UE 100 performs mobility control of the UE 100 itself. The mobility control includes various types of control in operation of changing a serving cell of the UE 100. Such operation includes, for example, handover, cell reselection, and the like.

The handover is operation of switching the serving cell of the UE 100 in the RRC connected state from a source cell to a target cell. The handover includes normal handover and conditional handover.

In the normal handover, the gNB 200 determines handover of the UE 100. For example, the UE 100 transmits a measurement report related to a radio state to the source cell according to deterioration of a radio state between the UE 100 and the source cell and/or improvement of a radio state between the UE 100 and the target cell. The source gNB 200 that manages the source cell determines the handover of the UE 100, based on the measurement report transmitted from the UE 100. Here, the measurement report includes a set of measurement results of cells measured by the UE 100 and identifiers of the cells. The measurement results of a cell include reference signal received power (RSRP) of the cell, reference signal received quality (RSRQ) of the cell, and the like.

The source gNB 200 selects the target cell from the cells included in the measurement report. The source gNB 200 transmits a handover request including a UE context to the target gNB 200 managing the target cell. In response to reception of a handover request acknowledgment response from the target gNB 200, the source gNB 200 transmits a handover instruction to the UE 100. In response to reception of the handover instruction, the UE 100 initiates handover to the target cell and transmits a random access signal to the target cell.

In contrast, in conditional handover, the handover of the UE 100 is determined by the UE 100 itself. Specifically, the source gNB 200 pre-transmits a handover request to a candidate gNB 200 that manages a candidate cell being a candidate for the target cell. In this regard, the number of the candidate gNBs 200 is not limited to one but may be plural. Thus, a plurality of the candidate gNBs 200 may receive the handover request.

The source gNB 200 pre-transmits a handover instruction to the UE 100. After receiving the handover instruction, the UE 100 suspends the handover until a trigger condition is satisfied, and when the trigger condition is satisfied, initiates the handover and transmits a random access signal to one candidate gNB.

For example, the UE 100 receives, from the source cell (source gNB 200), a handover instruction including a list of candidate cells being candidates for the target cell (the list is hereafter referred to as a cell list) and trigger conditions specified for the respective candidate cells in the cell list. In a case where a trigger condition corresponding to a particular candidate cell in the cell list included in the received handover instruction is satisfied, the UE 100 is handed over to the particular candidate cell for which the trigger condition is satisfied.

In such conditional handover, the source gNB 200 does not determine handover based on the measurement report, and the UE 100 itself determines handover. Thus, even in a case where the radio state between the UE 100 and the source gNB 200 is unstable, the handover is immediately performed according to the radio state, which thus can enhance the reliability (robustness) of the handover.

Mobility Control in NR-U

In NR-U, the gNB 200 is required to apply Listen Before Talk (LBT) before performing transmission of a radio signal. When the LBT is applied, the gNB 200 determines whether a channel is available or busy. In a case in which it is determined that the channel is available, the gNB 200 can execute transmission of the radio signal. In contrast, in a case in which it is determined that the channel is busy, the gNB 200 cannot execute transmission of the radio signal. The case in which it is determined that the channel is available is considered as LBT success. The case in which it is determined that the channel is busy is considered as LBT failure. The LBT applied to the gNB 200 (the cell managed by the gNB 200) is hereinafter referred to as "DL LBT".

The mobility control related to a cell operated in a frequency (carrier frequency) on a licensed band is basically based on the signal quality (RSRP, RSRQ, or the like) of the cell.

In the UE 100 that uses a cell (hereinafter referred to as a "U cell") operated in a frequency (carrier frequency) on the unlicensed band as the serving cell, even when the signal quality (specifically, signal quality of a radio signal transmitted according to DL LBT success) of the U cell is satisfactory, interruption of radio communication due to DL LBT failure of the U cell may occur.

Thus, in NR-U, it is preferable that the UE 100 perform mobility control related to the U cell after considering a DL LBT state of the U cell.

One criterion for evaluating the DL LBT state of the U cell in the UE 100 may be a reception state of a reference signal (hereinafter simply referred to as a "reference signal") periodically transmitted from the U cell in a predetermined period.

The reference signal includes a synchronization signal and PBCH block (SSB), a channel state information-reference signal (CSI-RS), a primary synchronization signal (PSS), a secondary synchronization signal (SSS), a cell-specific reference signal (CRS), and/or the like. Note that the SSB and the CSI-RS may be referred to as a radio link monitoring reference signal (RLM-RS).

Because the reference signal is periodically transmitted, on the condition that a transmission period is determined, the number of transmission occasions of the reference signal is also determined in the predetermined period. The U cell performs DL LBT immediately before the transmission occasion arrives, and if the U cell succeeds in the DL LBT, the U cell transmits the reference signal, and if the U cell fails in the DL LBT, the U cell does not transmit the reference signal. Thus, the reception state of the reference signal in the UE 100 in the predetermined period can reflect the state of the DL LBT of the U cell. The "reception state of the reference signal" hereinafter refers to the reception state of the reference signal in the UE 100 in the predetermined period. Note that the "reception state of the reference signal" is a concept different from the above-described signal quality such as RSRP and RSRQ.

The UE 100 according to an embodiment performs mobility control, based on the reception state of the reference signal.

Specifically, the UE 100 attempts reception of the reference signal in the predetermined period, counts at least one the number of unsuccessful receptions of the reference signal in the predetermined period and the number of successes in reception of the reference signal in the predetermined period, determines the reception state of the reference signal based on the counted number, and performs mobility control based on the determined reception state.

The determination criterion as to whether or not the reception of the reference signal succeeds is whether or not the reference signal can be decoded. The UE 100 determines that the reception of the reference signal succeeds when the reference signal can be decoded, and the determines that the reception of the reference signal fails when the reference signal cannot be decoded.

The UE 100 attempts the reception of the reference signal, based on transmission configuration information of the reference signal. The transmission configuration information includes cell identification information for identifying a cell in which the reference signal is transmitted, frequency identification information for identifying a carrier frequency to which the cell in which the reference signal is transmitted belongs, beam identification information for identifying a beam for transmitting the reference signal, information indicating a signal sequence of the reference signal, and/or the like. The UE 100 may receive the transmission configuration information from the serving cell. The transmission configuration information may further include information indicating a transmission period of the reference signal to be described later. Note that the transmission configuration information may include U cell information indicating the U cell. The UE 100 may determine whether or not to execute mobility control based on the reception state of the reference signal by using the U cell information.

The UE 100 may include a timer corresponding to the predetermined period, and a counter that counts the number. The UE 100 may separately include a counter that counts the number of successes and a counter that counts the number of failures. The UE 100 starts the timer in response to the start of attempt of reception of the reference signal, and attempts reception of the reference signal by the time the timer expires. The UE 100 increments the counter corresponding to the number of successes/failures by 1 according to success/failure of the reference signal.

The UE 100 determines the reception state of the reference signal, based on a value (the number of failures, the failure rate, the number of successes, and/or the success rate to be described later) calculated using the counted number in the predetermined period, and performs mobility control, based on the determination results. The determination methods of determining the reception state of the reference signal based on the value calculated using the number are as follows.

(a) Determination by Comparison Between Number of Failures and Threshold Condition The UE 100 counts the number of unsuccessful receptions of the reference signal in the predetermined period (number of failures), and when the number of failures satisfies a threshold condition, the UE 100 determines that the reception state of the reference signal is not satisfactory. In contrast, when the number of failures does not satisfy the threshold condition, the UE 100 determines that the reception state of the reference signal is satisfactory.

Here, "the number of failures satisfies the threshold condition" means that the number of failures is a first threshold or greater.

(b) Determination by Comparison Between Rate of Failure and Threshold Condition

The UE 100 counts the number of unsuccessful receptions of the reference signal in the predetermined period (number of failures), and determines a value obtained by dividing the number of failures by the number of transmission occasions of the reference signal in the predetermined period to be the failure rate. Then, when the rate of failure satisfies a threshold condition, the UE 100 determines that the reception state of the reference signal is not satisfactory. In contrast, when the rate of failure does not satisfy the threshold condition, the UE 100 determines that the reception state of the reference signal is satisfactory.

Here, "the rate of failure satisfies the threshold condition" means that the rate of failure is a second threshold or higher.

(c) Determination by Comparison Between Number of Successes and Threshold Condition The UE 100 counts the number of successful receptions of the reference signal in the predetermined period (number of successes), and when the number of successes satisfies a threshold condition, the UE 100 determines that the reception state of the reference signal is not satisfactory. In contrast, when the number of successes does not satisfy the threshold condition, the UE 100 determines that the reception state of the reference signal is satisfactory.

Here, "the number of successes satisfies the threshold condition" means that the number of successes is a third threshold or smaller.

(d) Determination by Comparison Between Rate of Success and Threshold Condition

The UE 100 counts the number of successful receptions of the reference signal in the predetermined period (number of successes), and determines a value obtained by dividing the number of successes by the number of transmission occasions of the reference signal in the predetermined period to be the rate of success. Then, when the rate of success satisfies a threshold condition, the UE 100 determines that the reception state of the reference signal is not satisfactory. In contrast, when the rate of success satisfies the threshold condition, the UE 100 determines that the reception state of the reference signal is satisfactory.

Here, "the rate of success satisfies the threshold condition" means that the rate of success is a fourth threshold or lower.

The "number of transmission occasions of the reference signal in the predetermined period" described above is determined based on the transmission period of the reference signal and the length of the predetermined period.

The transmission period of the reference signal may be indicated in the unit of seconds, or may be indicated in the unit of subframes. The value indicating the transmission period (a value indicating the number of seconds or a value indicating the number of subframes) may be configured for the UE 100 in advance, or may be configured from the gNB 200 to the UE 100 by means of broadcast signaling or unicast signaling.

The length of the predetermined period may be indicated in the unit of seconds, or may be indicated in the unit of subframes. The value indicating the length of the predetermined period (a value indicating the number of seconds or a value indicating the number of subframes) may be configured for the UE 100 in advance, or may be configured from the gNB 200 to the UE 100 by means of broadcast signaling or unicast signaling.

The first threshold to the fourth threshold may be configured from the gNB 200 to the UE 100 by means of broadcast signaling or unicast signaling, or may be configured for the UE 100 in advance. The first threshold to the fourth threshold may be determined based on the transmission period of the reference signal and the length of the predetermined period.

The UE 100 according to an embodiment determines the reception state of the reference signal from the U cell (whether or not the reception state is satisfactory) by using the determination methods described above, and performs mobility control related to the U cell, based on the determined reception state.

Operation Example Related to Conditional Handover

An operation example related to conditional handover (hereinafter referred to as "CHO") will be described.

At least one of candidate cells for the CHO is the U cell. The UE 100 determines the reception state of the reference signal from the U cell (whether or not the reception state is satisfactory) by using the determination methods described above, and performs control as to whether or not to perform access to the U cell, based on the determined reception state.

Figure 6:
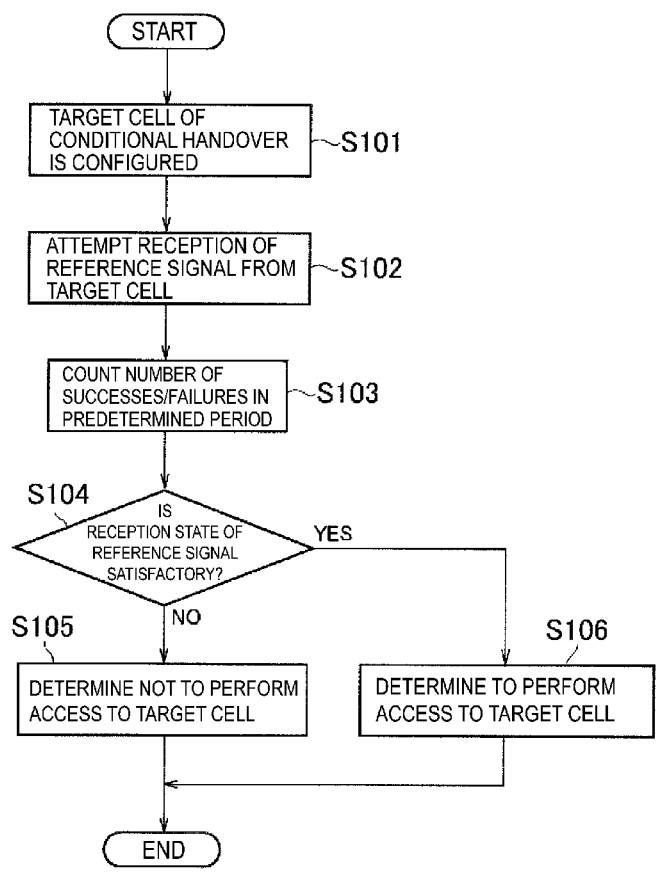
FIG. 6 is a diagram illustrating an operation example of conditional handover according to an embodiment.

FIG. 6 is a diagram illustrating an operation example related to the CHO.

As illustrated in FIG. 6, in Step S101, the UE 100 receives a handover instruction including a cell list including the U cell and a trigger condition specified for the U cell from the source cell (source gNB 200). The trigger condition specified for the U cell includes the reception state of the reference signal. Each of the parameters (the first to fourth thresholds, the transmission period, the length of the predetermined period, the number of the transmission occasions, and/or the like) obtained by the determination methods described above may be configured for the UE 100 in the handover instruction.

In Step S102, the UE 100 attempts reception of the reference signal from the U cell.

In Step S103, the UE 100 counts at least one of the number of successes and the number of failures of the reference signal in the predetermined period.

In Step S104, the UE 100 determines the reception state of the reference signal by using the determination methods described above. When it is determined that the reception state of the reference signal is not satisfactory (Step S104: NO), in Step S105, the UE 100 determines not to perform access to the U cell.

In contrast, when it is determined that the reception state of the reference signal is satisfactory (Step S104: YES), in Step S106, the UE 100 determines to perform access to the U cell.

When it is determined that access to the U cell is performed, the UE 100 transmits a random access preamble to the U cell.

Modified Example of Operation Example Related to CHO

A modified example of the operation example related to the CHO will be described. In the modified example of the operation example related to the CHO, the trigger condition specified for the U cell being the candidate cell of the CHO does not include the reception state of the reference signal. The UE 100 determines whether or not to perform access to the U cell, based on both of the trigger condition and the reception state of the reference signal.

Figure 7:
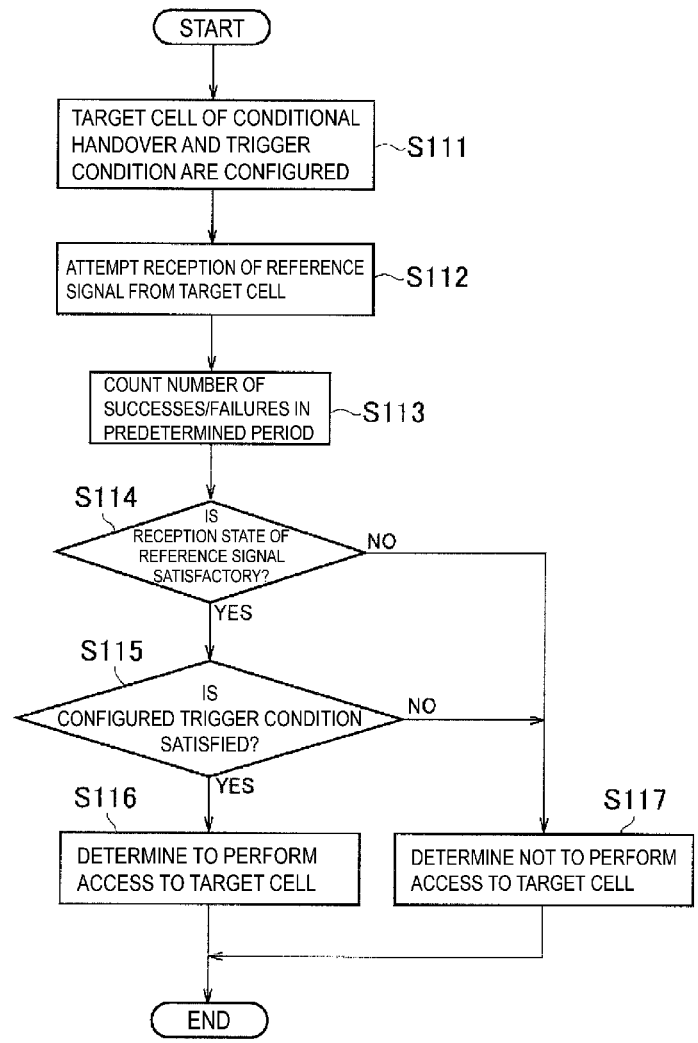
FIG. 7 is a diagram illustrating a modified example of the operation example of the conditional handover according to an embodiment.

FIG. 7 is a diagram illustrating operation related to the modified example of the operation example related to the CHO.

As illustrated in FIG. 7, in Step S111, the UE 100 receives a handover instruction including a cell list including the U cell and a trigger condition specified for the U cell from the source cell (source gNB 200). The trigger condition specified for the U cell does not include the reception state of the reference signal. The trigger condition is, for example, a condition based on the signal quality (RSRP, RSRQ, or the like) of the U cell. For example, when the RSRP of the U cell is a threshold or greater, the trigger condition is considered to be satisfied.

The processing from Step S112 to Step S114 is similar to the processing from Step S102 to Step S104 in FIG. 6.

In Step S114, when it is determined that the reception state of the reference signal is not satisfactory (Step S114: NO), in Step S117, the UE 100 determines not to perform access to the U cell.

In contrast, when it is determined that the reception state of the reference signal is satisfactory (Step S114: YES), in Step S115, the UE 100 determines whether or not the trigger condition specified for the U cell is satisfied.

When it is determined that the trigger condition specified for the U cell is satisfied (Step S115: YES), in Step S116, the UE determines to perform access to the U cell. In contrast, when it is determined that the trigger condition is not satisfied (Step S115: NO), in Step S117, the UE determines not to perform access to the U cell.

In this manner, in the modified example of the operation example related to the CHO, regarding the U cell being the candidate cell of the CHO, the UE 100 determines the reception state of the reference signal (Step S114) before determining the trigger condition (Step S115). When a plurality of U cells are configured as the candidate cells of the CHO, the UE 100 determines the reception state of the reference signal for each of the plurality of U cells before determining the trigger condition, and excludes the U cell whose reception state of the reference signal is determined to not be satisfactory from the candidate cells of the CHO.

In the modified example of the operation example related to the CHO, the order of Step S114 and Step S115 may be switched around. In other words, regarding the U cell being the candidate cell of the CHO, the UE 100 determines the reception state of the reference signal after determining the trigger condition. Regarding the U cell being the candidate cell, when it is determined that the trigger condition is satisfied and the reception state of the reference signal is not satisfactory, the UE 100 temporarily stops access to the U cell (temporarily stops transmission of the random access preamble). While the UE 100 temporarily stops the access, the UE 100 determines the reception state of the reference signal again, and if it is determined that the reception state is satisfactory, the UE 100 performs the access (transmits the random access preamble).

Operation Example Related to Normal Handover

An operation example related to normal handover (hereinafter referred to as "NHO") will be described.

A communication control method related to the operation example related to the NHO is a method related to control related to transmission of the measurement report in the normal handover.

In the operation example related to the NHO, the UE 100 performs control related to transmission of measurement results of the U cell, based on the reception state of the reference signal determined regarding the U cell.

Figure 8:
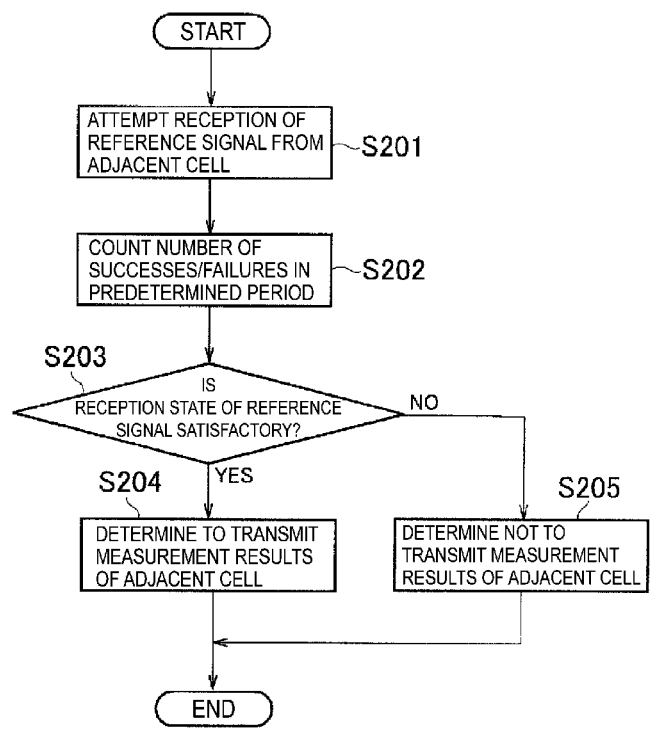
FIG. 8 is a diagram illustrating an operation example of normal handover according to an embodiment.

FIG. 8 is a diagram illustrating operation related to an operation example related to the NHO.

As illustrated in FIG. 8, in Step S201, the UE 100 attempts reception of the reference signal from the U cell being an adjacent cell of the serving cell.

In Step S202, the UE 100 counts at least one of the number of successes and the number of failures of the reference signal in the predetermined period.

In Step S203, the UE 100 determines the reception state of the reference signal by using the determination methods described above. When it is determined that the reception state of the reference signal is not satisfactory (Step S203: NO), in Step S205, the UE 100 determines not to transmit the measurement results of the U cell.

In contrast, when it is determined that the reception state of the reference signal is satisfactory (Step S203: YES), in Step S204, the UE 100 determines to transmit the measurement results of the U cell.

When it is determined that the measurement results of the U cell are not transmitted, the UE 100 does not include the measurement results of the U cell in the measurement report (measurement report in the normal handover). In this manner, handover to the U cell whose reception state of the reference signal is not satisfactory can be avoided.

Modified Example of Operation Example Related to NHO

In the operation example related to NHO, when it is determined that the reception state of the reference signal is not satisfactory regarding the U cell, the UE 100 determines not to transmit the measurement results of the U cell.

In contrast, in the modified example of the operation example related to NHO, when it is determined that the reception state of the reference signal is not satisfactory regarding the U cell, the UE 100 transmits an identifier of the U cell to the serving cell so as to avoid handover to the cell. The UE 100 may transmit the identifier of the U cell on the measurement report.

Operation Example Related to Cell Reselection

The UE 100 in the RRC idle state or the RRC inactive state may perform mobility control related to the U cell, based on the reception state of the reference signal from the U cell. The mobility control as described above may be control related to cell reselection of selecting the serving cell.

The UE 100 may perform control as to whether or not to select the U cell as the serving cell, based on the reception state of the reference signal from the U cell.

When it is determined that the reception state of the reference signal from the U cell is not satisfactory, the UE 100 does not select the U cell as the serving cell.

For example, the UE 100 excludes the U cell whose reception state of the reference signal is determined to not be satisfactory from target cells of cell reselection. For example, the UE 100 may consider that the U cell whose reception state of the reference signal is determined to not be satisfactory does not satisfy a criterion (S criterion) of cell selection.

Further, when the UE 100 performs cell reselection based on frequency priority, the UE 100 may adjust priority of the carrier frequency to which the U cell belongs depending on the reception state of the reference signal of the U cell. For example, the priority is adjusted to be higher as the reception state is better, and the priority is adjusted to be lower as the reception state is worse. For example, if the reception state is represented by the "rate of success" described above, the priority is adjusted to be higher as the rate of success is higher.

Further, when the UE 100 performs cell reselection based on ranking, the UE 100 may adjust the rank of the U cell depending on the reception state of the reference signal of the U cell. For example, the rank is adjusted to be higher as the reception state is better, and the rank is adjusted to be lower as the reception state is worse. For example, if the reception state is represented by the "rate of success" described above, the rank is adjusted to be higher as the rate of success is higher.

Other Embodiments

In the embodiments described above, mobility operation related to DL LBT is described. Meanwhile, in NR-U, the UE 100 applies LBT before performing transmission of the radio signal, and thus mobility control by LBT (hereinafter referred to as "UL LBT") applied to the UE 100 also has room to be studied.

The UE 100 performs UL LBT at the time of transmitting the random access preamble to the target cell. When UL LBT continuously fails, the UE 100 determines that a radio link failure (RLF) occurs (in other words, the UE 100 detects an RLF).

In response to detection of the RLF, the UE 100 first performs processing of transitioning from the RRC connected state to the RRC idle state, then performs cell selection processing of selecting another cell, and subsequently performs RRC reestablishment processing for the selected cell. The series of processing in response to detection of the RLF may impose a large load on the UE 100.

Meanwhile, in the CHO, a plurality of target cells can be configured for the UE 100, and thus even if access to a certain target cell fails due to UL LBT, it is desirable that the UE 100 attempt access to another target cell before detecting an RLF. For example, the UE 100 executes the following operation.

Firstly, the UE 100 receives, from the source cell (source gNB 200), a handover instruction including a cell list including a plurality of U cells and a trigger condition specified for each of the plurality of U cells.

Secondly, the UE 100 applies UL LBT to the first U cell that satisfies the trigger condition among the plurality of U cells, and attempts transmission of the random access preamble.

Thirdly, when UL LBT for transmission of the random access preamble to the first U cell consecutively fails a first number of times or more, the UE 100 stops the attempt of transmission of the random access preamble to the first U cell. Information indicating a value of the first number of times may be included in the handover instruction.

Fourthly, the UE 100 determines the trigger condition for the U cells other than the first U cell among the plurality of U cells included in the handover instruction, and when it is determined that the trigger condition is satisfied, the UE 100 attempts transmission of the random access preamble to the U cells.

Each of the embodiments described above may not only be separately and independently implemented, but also be implemented in combination of two or more embodiments.

Although the 5G system (NR) is primarily described in each of the embodiments described above, operations according to each embodiment may be applied to LTE.

Note that a program causing a computer to execute each of the processes performed by the UE 100 or the gNB 200 may be provided. The program may be recorded in a computer readable medium. Use of a computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like.

In addition, circuits for executing the processes to be performed by the UE 100 or the gNB 200 may be integrated, and at least part of the UE 100 or the gNB 200 may be configured as a semiconductor integrated circuit (a chipset or an SoC).

Although an embodiment has been described in detail with reference to the drawings, a specific configuration is not limited to those described above, and various design modifications and the like can be made without departing from the gist.

The invention claimed is:

1. A communication control method used in a user equipment, the communication control method comprising:
counting, in a predetermined period, a number of Listen Before Talk (LBT) failures in a cell operated in an unlicensed band; and
in response to a number of the LBT failures being greater than or equal to a threshold configured to the user equipment by a serving cell of the user equipment, transmitting, by the user equipment to the serving cell, an identifier of the cell in which the number of the LBT failures being greater than or equal to the threshold.

2. The communication control method according to claim 1, wherein
the cell is a target cell of a handover of the user equipment, and
the communication control method further comprises: in response to the number of the LBT failures being greater than or equal to the threshold, performing control as to not to perform access to the cell.

3. The communication control method according to claim 2, wherein
the handover is a conditional handover in which a plurality of candidate cells are configured to the user equipment as the target handover, by the serving cell, and
the communication control method further comprises: perform the control for each of the plurality of candidate cells.

4. The communication control method according to claim 1, wherein
the cell is a neighboring cell of the serving cell, and
the communication control method further comprises: in response to the number of the LBT failures being greater than or equal to the threshold, performing a control as to not to transmit measurement result of the cell to the serving cell.

5. The communication control method according to claim 1, further comprising:
in a radio resource control (RRC) idle state or an RRC inactive state, in response to the number of the LBT failures being greater than or equal to the threshold, performing control as to not to select the cell as a new serving cell of the user equipment.

6. A user equipment comprising:
a processor and a memory, wherein the processor is configured to:
count, in a predetermined period, a number of Listen Before Talk (LBT) failures in a cell operated in an unlicensed band; and
in response to a number of the LBT failures being greater than or equal to a threshold configured to the user equipment by a serving cell of the user equipment, transmit, to the serving cell, an identifier of the cell in which the number of the LBT failures being greater than or equal to the threshold.

7. An apparatus controlling a user equipment, the apparatus comprising:
a processor and a memory, wherein the processor is configured to:
count, in a predetermined period, a number of Listen Before Talk (LBT) failures in a cell operated in an unlicensed band; and
in response to a number of the LBT failures being greater than or equal to a threshold configured to the user equipment by a serving cell of the user equipment, transmit, to the serving cell, an identifier of the cell in which the number of the LBT failures being greater than or equal to the threshold.

8. A non-transitory computer-readable medium comprising, stored thereupon, computer program instructions for execution by a user equipment, the program instructions being configured to cause the user equipment to execute processing of:
counting, in a predetermined period, a number of Listen Before Talk (LBT) failures in a cell operated in an unlicensed band; and
in response to a number of the LBT failures being greater than or equal to a threshold configured to the user equipment by a serving cell of the user equipment, transmitting, to the serving cell, an identifier of the cell in which the number of the LBT failures being greater than or equal to the threshold.

9. A system comprising:
a user equipment configured to:
count, in a predetermined period, a number of Listen Before Talk (LBT) failures in a cell operated in an unlicensed band; and
in response to a number of the LBT failures being greater than or equal to a threshold configured to the user equipment by a serving cell of the user equipment, transmit, to the serving cell, an identifier of the cell in which the number of the LBT failures being greater than or equal to the threshold.

* * * * *